(12) United States Patent
Bode et al.

(10) Patent No.: US 11,465,589 B2
(45) Date of Patent: Oct. 11, 2022

(54) ATTACHMENT FOR A WIPER ARM

(71) Applicants: A. RAYMOND ET CIE, Grenoble (FR); AUDI AG, Ingolstadt (DE)

(72) Inventors: Karl Bode, Lörrach (DE); Stephan Häfner, Prebitz (DE); Axel Feger, Lörrach (DE)

(73) Assignees: A. Raymond et Cie, Grenoble (FR); Audi AG, Ingolstadt (DE)

( * ) Notice: Subject to any disclaimer, the term of this patent is extended or adjusted under 35 U.S.C. 154(b) by 0 days.

(21) Appl. No.: 17/281,117

(22) PCT Filed: Oct. 1, 2019

(86) PCT No.: PCT/EP2019/076564
§ 371 (c)(1),
(2) Date: Mar. 29, 2021

(87) PCT Pub. No.: WO2020/074317
PCT Pub. Date: Apr. 16, 2020

(65) Prior Publication Data
US 2021/0354663 A1  Nov. 18, 2021

(30) Foreign Application Priority Data
Oct. 8, 2018 (DE) .......................... 102018007917.2

(51) Int. Cl.
*B60S 1/34* (2006.01)
*B60S 1/04* (2006.01)
*B60S 1/52* (2006.01)

(52) U.S. Cl.
CPC ........... *B60S 1/3429* (2013.01); *B60S 1/0408* (2013.01); *B60S 1/3415* (2013.01); *B60S 1/522* (2013.01)

(58) Field of Classification Search
CPC .. B60S 1/52; B60S 1/522; B60S 1/524; B60S 1/544; B60S 1/3415; B60S 1/3429;
(Continued)

(56) References Cited

U.S. PATENT DOCUMENTS

| 4,782,547 A | 11/1988 | Mohnach |
| 5,430,909 A * | 7/1995 | Edele .................... B60S 1/3415 15/250.04 |

(Continued)

FOREIGN PATENT DOCUMENTS

| DE | 2942086 | * | 4/1981 |
| DE | 4415081 | * | 11/1995 |

(Continued)

OTHER PUBLICATIONS

English translation of International Search Report for PCT/EP2019/076564 dated Dec. 11, 2019, 2 pages.

(Continued)

*Primary Examiner* — Gary K. Graham
(74) *Attorney, Agent, or Firm* — Warner Norcross + Judd LLP

(57) ABSTRACT

An attachment for a wiper arm of a windscreen wiper of a vehicle, having a rod arm, comprises a fluid channel for conducting a fluid and a first dimensionally stable element, wherein a first fluid channel section is formed in the first dimensionally stable element. The attachment also comprises a second dimensionally stable element, wherein a second fluid channel section is formed in the second dimensionally stable element. A wiper arm including the attachment is also disclosed.

15 Claims, 6 Drawing Sheets

(58) Field of Classification Search
CPC .......... B60S 1/0408; F16L 11/12; B05B 1/10; B05B 1/14
USPC ........... 15/250.201, 250.351, 250.04, 250.02
See application file for complete search history.

(56) References Cited

U.S. PATENT DOCUMENTS

| | | |
|---|---|---|
| 2007/0018012 A1 | 1/2007 | Harris et al. |
| 2016/0368460 A1 | 12/2016 | Ernst et al. |
| 2018/0194329 A1 | 7/2018 | Umeno |
| 2020/0398796 A1 | 12/2020 | Zimmer et al. |

FOREIGN PATENT DOCUMENTS

| | | |
|---|---|---|
| DE | 102017012038 A1 | 6/2019 |
| JP | 2006007971 A | 1/2006 |
| WO | 199906252 A1 | 2/1999 |

OTHER PUBLICATIONS

Machine assisted English translation of WO199906252A1 obtained from https://patents.google.com/patent on Mar. 26, 2021, 7 pages.
Machine assisted English translation of JP2006007971A obtained from https://patents.google.com/patent on Mar. 26, 2021, 6 pages.

\* cited by examiner

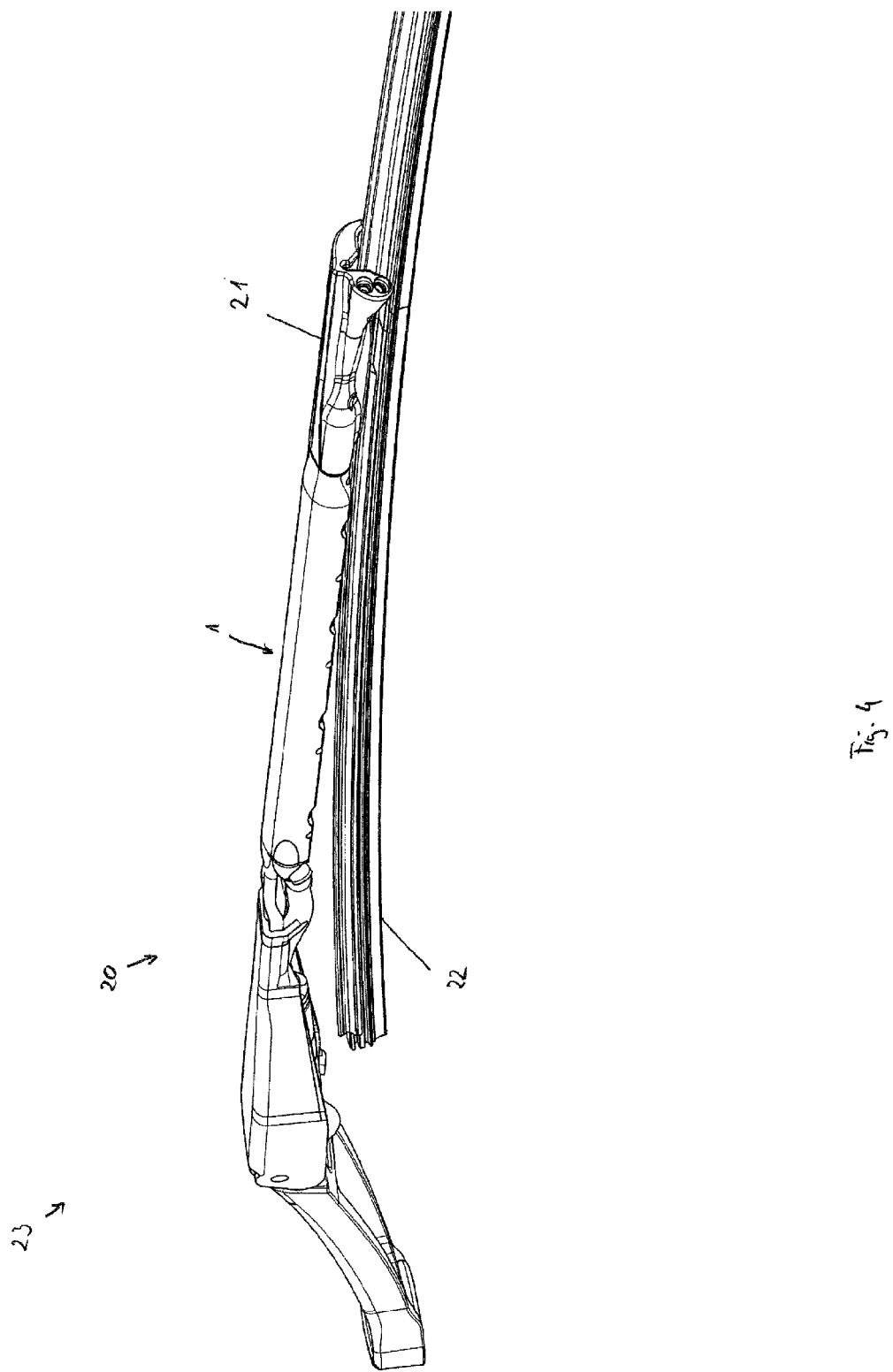

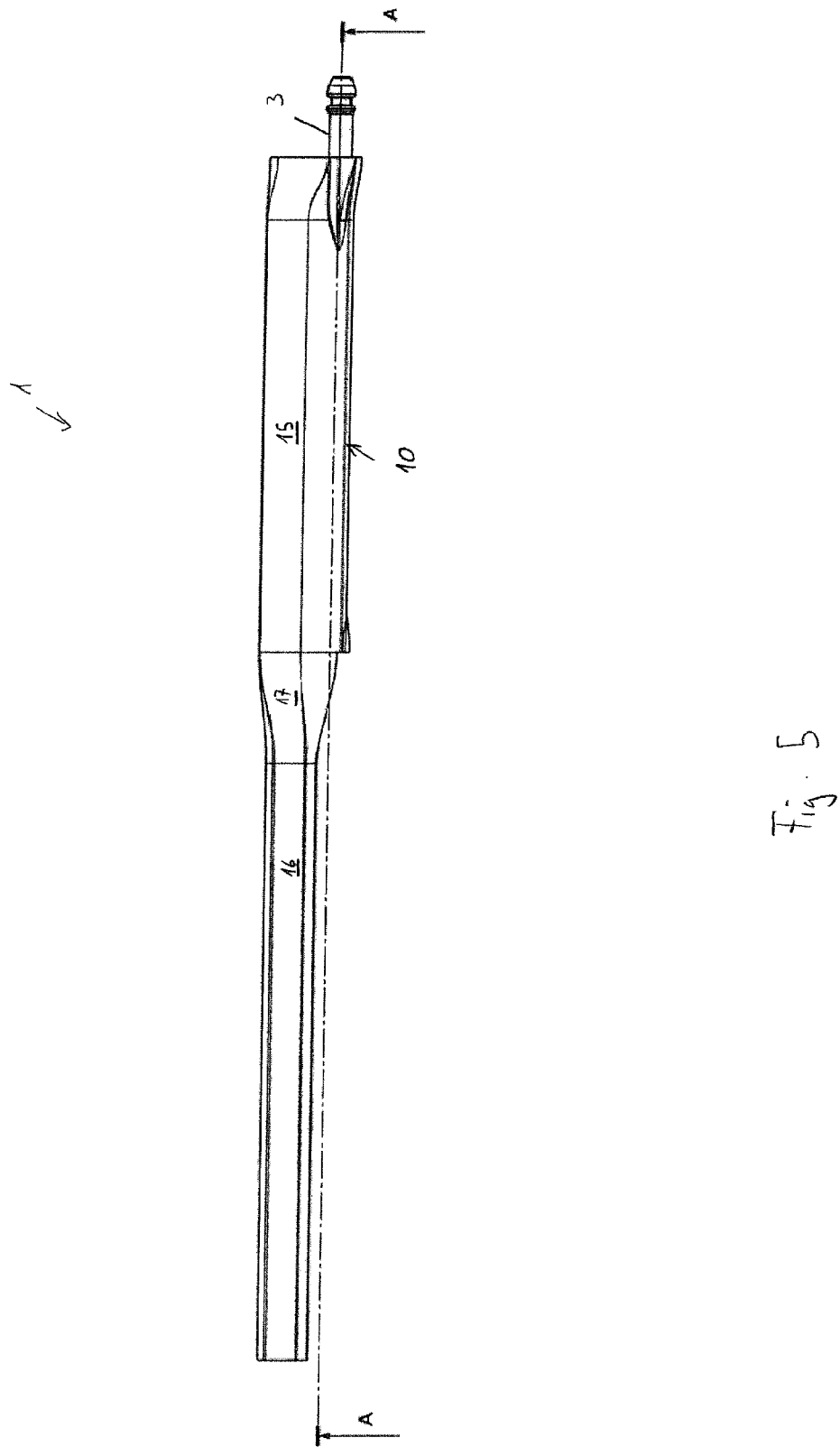

ATTACHMENT FOR A WIPER ARM

CROSS-REFERENCE TO RELATED APPLICATIONS

This application is the U.S. National Stage of International Application No. PCT/EP2019/076564 filed on 1 Oct. 2019, which claims priority to and all advantages of German Application No. 102018007917.2, filed on 8 Oct. 2018, which are incorporated by reference herein.

FIELD OF THE INVENTION

The invention generally relates to an attachment and, more specifically, to an attachment for a wiper arm for a vehicle.

BACKGROUND OF THE INVENTION

Generic attachments from the prior art are usually designed to be either dimensionally-stable or flexible. Dimensionally-stable attachments have the disadvantage that they cannot adapt to the shape of the rod arm. This is, in particular, problematic in the case of attachments which are slid over the rod arm. If, as in many cases, the rod arm has an angular or curved shape, the attachment cannot be slid over the entire length of the rod arm. Flexible attachments, on the other hand, have the disadvantage that they can undergo shape changes which can lead to important functions of the windscreen wiper being impaired. For example, the alignment of fluid outlets may change, or the position of channel connection points may shift.

The aim of the invention is therefore to propose a generic attachment which can adapt better to the shape of various rod arms and at the same time allows secure positioning.

BRIEF SUMMARY

An attachment for a wiper arm, having a rod arm, of a windscreen wiper of a vehicle is disclosed. The attachment comprises:
a fluid channel for conducting a fluid,
a first dimensionally-stable element, wherein a first fluid channel section is formed in the first dimensionally-stable element, and
a second dimensionally-stable element, wherein a second fluid channel section is formed in the second dimensionally-stable element,
wherein
the first dimensionally-stable element has a connecting section for connecting the first dimensionally-stable element to the rod arm, wherein the connecting section has a receptacle for accommodating the rod arm, and the receptacle defines an opening through which the rod arm can be inserted into the receptacle,
and/or
the second dimensionally-stable element has a connecting section for connecting the second dimensionally-stable element to the rod arm, wherein the connecting section has a receptacle for accommodating the rod arm, and the receptacle defines an opening through which the rod arm can be inserted into the receptacle,
and
a flexible element is provided which has a connecting section for connecting the first dimensionally-stable element to the rod arm, wherein the connecting section has a receptacle for accommodating the rod arm, and the receptacle defines an opening through which the rod arm can be inserted into the receptacle,
wherein the flexible element covers the first dimensionally-stable element at least in sections, and the flexible element covers the second dimensionally-stable element at least in sections.

The invention is based upon the basic idea of using an attachment with a first dimensionally-stable element, a second dimensionally-stable element, and a flexible element. In this case, the dimensionally-stable elements can form the parts of the attachment which, in particular, ensure secure positioning. The flexible element, which covers the dimensionally-stable elements at least in sections, is, in particular, suitable for adapting, by virtue of its flexibility, the shape of the dimensionally-stable elements and of the rod arm. In this case, the flexible element can cover locations on rod arms which cannot be covered by conventional attachments—in particular, if the rod arms have an angular or curved shape. In addition, as a result of the covering, the flexible element forms at least part of the outer surface of the attachment. The surface can be designed in such a way that, in particular, aerodynamic, but also aesthetic, requirements can be taken into account.

The attachment has a fluid channel. In the sense of the invention, the term, "fluid channel," refers to the fluid channel which the attachment has. The fluid channel serves to conduct fluid through the attachment. In particular, the fluid is supplied to a nozzle by means of which fluid can be sprayed onto a window of a vehicle. In particular, the fluid flows through the entire fluid channel of the attachment. Suitable as fluids are, in particular, liquids which can be used for cleaning a vehicle window.

In the sense of the invention, the term, "fluid channel section," refers to a section of the fluid channel which the attachment has. This applies to the fluid section formed in the first dimensionally-stable element (first fluid channel section), the fluid channel section formed in the second dimensionally-stable element (second fluid channel section), and the fluid channel section formed in the flexible element (third fluid channel section). Typically, the first fluid channel section and the connecting section of the first dimensionally-stable element are integrally formed. For example, they can be produced integrally by injection molding. In specific embodiments, the first fluid channel section has a fixed position with respect to the connecting section of the first dimensionally-stable element. As a result, parts of the fluid channel section, such as fluid outlets, have a constant alignment to the connecting section. Typically, the second fluid channel section and the connecting section of the second dimensionally-stable element are integrally formed. For example, they can be produced integrally by injection molding. In specific embodiments, the second fluid channel section has a fixed position with respect to the connecting section of the second dimensionally-stable element. As a result, parts of the fluid channel section, such as fluid outlets, have a constant alignment to the connecting section.

In certain embodiments, the fluid channel consists exclusively of the first, second, and third fluid channel sections. It is, alternatively, conceivable for the fluid channel to also have other sections. Other sections may be, for example, segments that provide a fluid connection between the fluid channel sections. An example of a segment is a hose or a tube. A fluid channel section may be indirectly or directly connected to another fluid channel section. In this context, an indirect connection is to be understood to mean merely a fluid connection. In this context, a direct connection is to be understood to mean that a fluid channel section adjoins another fluid channel section, and fluid can flow in the flow direction from the one fluid channel section directly into the other fluid channel section.

Statements in the description generally referring to "element" refer at the same time to the first dimensionally-stable element, the second dimensionally-stable element, and the flexible element. This is not true if reference is explicitly made to a particular element (e.g., flexible element). Statements in the description generally referring to "dimensionally-stable element" refer at the same time to the first dimensionally-stable element and the second dimensionally-stable element. This is not true if reference is explicitly made to a particular dimensionally-stable element (e.g., first dimensionally-stable element).

The dimensionally-stable element essentially undergoes no change in shape if the dimensionally-stable element is acted upon by forces which usually act upon wiper arms when wiper arms are used. These are, for example, forces which arise as a result of the airflow. Another example are forces resulting from the fluid flowing in the fluid channel sections. However, the change in shape that takes place intentionally during assembly is not to be taken into account. An intentional change in shape occurs, for example, when a part of the receptacle of the connecting section of the dimensionally-stable element is removed or unfolded in order to insert the rod arm (see below).

The dimensional stability causes the dimensionally-stable element to more reliably maintain its position with respect to the rod arm in comparison to a flexible element. The dimensional stability furthermore causes the first dimensionally-stable element to more reliably maintain its position with respect to the second dimensionally-stable element. The dimensional stability furthermore causes the first dimensionally-stable element to more reliably maintain its position with respect to the elastic element. The dimensional stability also causes the first dimensionally-stable element to more reliably maintain its position with respect to connector components, such as a nozzle carrier with a nozzle. The dimensional stability also causes the risk of unwanted changes in the shape of the dimensionally-stable element to be reduced. The dimensional stability prevents the dimensionally-stable element from unintentionally changing shape during the machining of the dimensionally-stable element. Examples of machining are the introduction of bores or threads into the dimensionally-stable element.

The dimensional stability thus increases the reliability of the function of the windscreen wiper. Leakages are avoided, for example, because fluid channel sections which immediately follow one another in the fluid flow direction are not displaced relative to one another. The desired spraying direction of the fluid is maintained, since the alignment of fluid outlet points is not changed. The pressure of the fluid jet intended to impinge on a window is not impaired by deformations of the fluid channel section of the dimensionally-stable element. The absence of resilience leads to increased manufacturing accuracy. Narrower tolerance ranges can thereby be satisfied. This, in particular, improves the function of fluid outlets and nozzle elements which are introduced into or onto the dimensionally-stable element.

The flexibility, on the other hand, causes the flexible element to be able to adapt to the shape of the rod arm. It can also adapt to the shape of the dimensionally-stable element. The flexible element is, in particular, bendable and elastic. It is, typically, substantially tubular and rubber-hose-like and can expand, in particular, in the transverse direction when it is pulled over an object which has a larger cross-section than the cross-section of the flexible element itself.

The flexible element forms at least part of the outer surface of the attachment. In a typical embodiment in which the flexible element completely covers the dimensionally-stable element, the flexible element forms the entire outer surface of the attachment. Since the attachment is connected to the rod arm in such a way that the rod arm is accommodated in a receptacle of the attachment, the flexible element thus also at least partially forms the outer surface for this connection.

Technical requirements which have to be fulfilled by the outer surface of a known rod arm and the outer surface of components attached to this rod arm, such as nozzle units, hoses, or tubes, must, according to the teaching of the invention, be fulfilled only by the outer surface of the flexible element. The technical requirements must therefore only be imposed on a single part. The technical requirements which have to be fulfilled by the outer surface of the flexible element include, in particular, aerodynamic requirements. The flexible element can be shaped in such a way that its outer surface can deflect the airflow. Typically, the flexible element can be shaped in such a way that the airflow can be utilized in order to generate a pressing force on the rod arm, and thus on the wiper blade. As a result, the wiper blade reliably lies against the window of the vehicle even at high driving speeds, so that high wiping quality can be ensured. Since the flexible element forms the outer surface of the attachment, it may also be shaped in such a way that it achieves an aesthetic effect. Since the attachment is not made of one piece, per the teaching according to the invention, the flexible element can be replaced by another flexible element. The need for replacement may exist, for example, when a flexible element is damaged or when the technical or aesthetic requirements on the flexible element have changed. This replacement possibility is a resource-saving alternative to replacing the entire rod arm. The covering of the dimensionally-stable element by the flexible element can furthermore have the advantage that the dimensionally-stable element is more securely connected to the rod arm. This is, in particular, the case if the flexible element is connected to the dimensionally-stable element in the manner of an interference fit when the dimensionally-stable element is covered.

The flexible element typically covers the first dimensionally-stable element not only in sections, but completely. Furthermore or alternatively, the flexible element covers the second dimensionally-stable element not only in sections, but completely. In specific embodiments, the flexible element completely covers the first dimensionally-stable element up to a part of the first fluid channel section and/or of a connector of the first flexible element.

Statements in the description generally referring to "connecting section" refer at the same time to the connecting section of the dimensionally-stable element, the connecting section of the flexible element, and the connecting section of the carrier. This is not true when reference is explicitly made to a connecting section of a particular element or of the carrier (e.g., connecting section of the flexible element). The same applies to the components of the connecting section (receptacle and opening).

The connecting section serves to connect the element or the carrier to the rod arm. The connection can take place in a non-positive, positive, or firmly-bonded manner. A connection may also take place by combining two or three of these principles of action. Typically, the connection can be detached (detachable connection) without destroying or impairing the function of the connecting section and of the rod arm. This makes re-use possible. In certain embodiments, the connection is established by the receptacle enveloping or enfolding the rod arm or a part of the rod arm.

The connection of the flexible element to the rod arm can be established by partially direct contact between the receptacle of the connecting section of the flexible element. In particular, the connection of the flexible element to the rod arm takes place indirectly, at least in sections, in that the dimensionally-stable element is located between the rod arm and the receptacle of the connecting section of the flexible element.

The connecting section has a receptacle with an opening through which the rod arm can be inserted into the receptacle. The receptacle serves to accommodate the rod arm or a part of the rod arm in the receptacle. In a typical embodiment, the receptacle is tubular. The profile of the tubular receptacle is oftentimes closed. For example, this profile is substantially circular or rectangular. Alternatively, the profile of the tubular receptacle is open. For example, this profile is substantially U-shaped or V-shaped. A receptacle with a substantially U-shaped or V-shaped profile can connect the rod arm in that the walls of the receptacle enfold the rod arm.

The opening serves to allow the rod arm to be inserted through it into the receptacle. The term, "opening," in the sense of the invention, refers to a point which is suitable for guiding a rod arm into the receptacle in such a way that the rod arm can be accommodated in the receptacle. In one embodiment, the receptacle may have several openings. This allows a more flexible assembly.

In a tubular receptacle, the opening is attached to one end of the tube. A rod arm can be inserted into the receptacle along the direction of the longitudinal axis of the tube. In the case of a tubular receptacle whose profile is open, the opening is typically the lateral opening, caused by the opening of the profile, of the tubular receptacle. In this case, a rod arm can be inserted laterally into the tubular receptacle. In one embodiment, a tubular receptacle with a closed profile also offers the possibility of providing a lateral opening. This can be realized in that the tubular receptacle is divided by a plane into two tube parts. This plane has the longitudinal axis of the tube or is parallel to the longitudinal axis of the tube, but intersects the tube. The tube parts are movable with respect to one another in such a way that a lateral opening of the tubular profile can be provided. The receptacle can thus be designed so that it can be opened and/or closed. In an exemplary embodiment, this is made possible in that the one tube part can be removed from the other tube part. The tube parts are typically detachably connected to one another—for example, by means of a latching connection. This makes it possible to connect the tube parts to one another again, after inserting a rod arm into the lateral opening. In a further exemplary embodiment, this is made possible in that those ends of the tube parts which face one another and are separated by the plane are connected to one another via a hinge joint. The other ends of the tube parts which face one another and are separated by the plane can be detachably connected to one another—for example, by means of a latching connection.

In a typical embodiment, a third fluid channel section forming a section of the fluid channel is formed in the flexible element. The third fluid channel section is often arranged between the first fluid channel section and the second fluid channel section. It is generally connected directly to the first fluid channel section and directly to the second fluid channel section.

The third fluid channel section is typically formed by the flexible element covering at least one gap located between the first fluid channel section and the second fluid channel section. Between the first fluid channel section and the second fluid channel section, this covering creates a space through which fluid can flow from the first fluid channel section to the second fluid channel section.

In a specific embodiment, the attachment has a carrier which has a connecting section for connecting the carrier to the rod arm. The first dimensionally-stable element and the second dimensionally-stable element are arranged on this carrier in such a way that a section of the connecting section of the carrier forms the connecting section of the first dimensionally-stable element, and another section of the connecting section of the carrier forms the connecting section of the second dimensionally-stable element. The connecting section of the first dimensionally-stable element and the connecting section of the second dimensionally-stable element may be directly connected to one another. Alternatively, they may be indirectly connected to one another by arranging between them a section of the connecting section of the carrier part that does not form the connecting section of the first dimensionally-stable element and that does not form the connecting section of the second dimensionally-stable element. The carrier is typically formed from one piece. The carrier can be produced by injection molding, for example.

The carrier has the connecting section of the first dimensionally-stable element and the connecting section of the second dimensionally-stable element. The carrier thus forms a sub-assembly of the wiper arm. This reduces the assembly effort. Omitted as a result are, in particular, the steps of connecting the connecting section of the first dimensionally-stable element to the connecting section of the second dimensionally-stable element or of fixing the position of the connecting section of the first dimensionally-stable element relative to the position of the connecting section of the second dimensionally-stable element. Since the first fluid channel section typically has a fixed position with respect to the connecting section of the first dimensionally-stable element, and the second fluid channel section generally has a fixed position with respect to the connecting section of the second dimensionally-stable element, they thus also have a fixed position relative to one another and in each case relative to the carrier. As a result, parts of the first fluid channel section, such as fluid outlets, have not only a constant alignment to the connecting section of the first dimensionally-stable element, but also a constant alignment to the second dimensionally-stable element and to the carrier. The same applies to the parts of the second fluid channel section. This increases the reliability of the function of the windscreen wiper.

The receptacle of the first dimensionally-stable element, the receptacle of the second dimensionally-stable element, and the receptacle of the carrier are typically tubular. In specific embodiments, these receptacles have a closed profile, which can be substantially rectangular. The entire sub-assembly can thus be connected to the rod arm by inserting the rod arm into the receptacles of the carrier.

In a specific embodiment, a connector for a hose or a nozzle carrier is formed on the first dimensionally-stable element. Furthermore or alternatively, a connector for a hose is formed on the second dimensionally-stable element. The term, "connector," in the sense of the invention, refers to a means that enables a connection between the dimensionally-stable element and a connector part. This is, in particular, a clutch or a clutch part. The connector is typically in fluid connection with the fluid channel section of the dimensionally-stable element. The connector generally has a sealing means which serves to prevent fluid from escaping at the connection point when the connection is established. Suitable connector parts are, for example, hoses, nozzles, nozzle carriers, connection fittings, connection tubes, coupling means, the flexible element, or other dimensionally-stable elements. Typically, the connector of the second dimensionally-stable element is provided for a hose which guides fluid from the fluid source to the attachment. In specific embodiments, the connector of the first dimensionally-stable element is provided for a nozzle carrier or for a hose which guides the fluid from the attachment to a nozzle carrier. In particular, the connector is a connection fitting. The connection fitting can have an external or internal thread. The connector may also be a recess, e.g., a bore with an internal thread.

In a specific embodiment, the first dimensionally-stable element and/or the second dimensionally-stable element has a fluid outlet and/or a nozzle element. The term, "fluid outlet," in the sense of the invention, refers to a recess which is created in the first dimensionally-stable element, in the second dimensionally-stable element, or in the flexible element and is in fluid connection with the fluid channel section of this element, and via which fluid can escape from the element. The recess may be cylindrical, for example. The recess may also have the shape of a nozzle, for example, and is also called a nozzle in this case.

The term, "nozzle element," in the sense of the invention, refers to a component having a nozzle. This can be, for example, a spherical nozzle or a nozzle chip. The nozzle element is in fluid connection with the dimensionally-stable element or with the flexible element so that fluid can escape from the fluid channel section via the nozzle of the nozzle element.

In addition, because an element has a fluid outlet or a nozzle element, fluid can be applied to the window or to the wiper blade, or the wiper blade can thereby be wetted. Typically, all dimensionally-stable elements have one or more fluid outlets or nozzle elements.

In a specific embodiment, the flexible element has protruding wind deflectors. The term, "wind deflector," refers to a means that serves to conduct the airflow around the attachment. The wind deflector reduces the resistance as a result of the airflow and increases the pressing force on the attachment, and thus on the wiper blade. This ensures that the wiper blade lies against the vehicle window, even at high driving speeds. A high wiping quality is thereby made possible. In addition, the wind deflector can be designed in such a way that it directs the airflow in favor of the water jet, which arises from the fluid being applied from a nozzle to the vehicle window. The wind deflector is formed as part of the flexible element. It is formed by the shape of the flexible element. A separate component is not required. Because the wind deflector is part of the flexible element, it can be attached to points of the rod arm to which, in particular, dimensionally-stable wind deflectors cannot be attached or can be attached in a comparatively awkward fashion.

In a specific embodiment, the flexible element has a base body and an end section. A bending section is provided between the base body and the end section. The base body, the end section, and the bending section are, in particular, flexible. The elastic deformability of the base body is reduced when the base body encloses the dimensionally-stable elements.

Thus, in particular, an adaptation is made to a familiar type of rod arm, which has first and second, substantially straight sections which adjoin one another and are arranged at an angle—in particular, an obtuse angle—relative to one another. Because the flexible element already has a shape approximating or even corresponding to the shape of the rod arm, the assembly step in which the flexible element is brought to cover the rod arm is facilitated, and the adaptation of the flexible element to the rod arm is improved.

The bending section connects the base body and the end section. The bending section is substantially straight in the unassembled state and substantially angular in the assembled state. The angular shape is assumed in that the elastic regions follow the angular shape of the windscreen wiper arm rod when being slid thereon. The bending section may have an obtuse angle.

The base body and the end section are, in specific embodiments, substantially straight sections of the flexible element. The base body is, typically, the longer section.

In a specific embodiment, the attachment has a lateral fluid outlet through which a portion of the fluid guided through the fluid channel can be discharged.

As already stated above, the term, "fluid outlet," in the sense of the invention, refers to a recess which is created in the first dimensionally-stable element, in the second dimensionally-stable element, or in the flexible element and is in fluid connection with the fluid channel section of this element, and via which fluid can escape from the element.

In particular, the fluid outlet possessed by an element is a fluid outlet possessed by the attachment. In this case, fluid can escape not only from the element, but also from the attachment. This is the case, for example, when the outer surface of the element is at the same time the outer surface of the attachment. This is also the case, for example, when the dimensionally-stable element that has a fluid outlet is covered by the flexible element that has a fluid outlet, and these fluid outlets are in fluid connection.

In addition, because the attachment has a fluid outlet, fluid can be applied to the window or to the wiper blade, or the wiper blade can thereby be wetted.

The term, "lateral," in this context means that the fluid outlet is not aligned in parallel to the longitudinal axis of the attachment. The term, "lateral," generally means that the fluid outlet is aligned perpendicularly to the longitudinal axis of the attachment.

The attachment preferably has several lateral fluid outlets.

The invention also relates to a wiper arm of a windscreen wiper of a vehicle. The wiper arm has a rod arm and an attachment according to the invention. The first dimensionally-stable element is connected to the rod arm via the connecting section of the first dimensionally-stable element, wherein the rod arm is accommodated in the receptacle of the connecting section of the first dimensionally-stable element. Additionally or alternatively, the second dimensionally-stable element is connected to the rod arm via the connecting section of the second dimensionally-stable element, wherein the rod arm is accommodated in the receptacle of the connecting section of the second dimensionally-stable element. The flexible element is, furthermore, connected to the rod arm via the connecting section of the flexible element, wherein the rod arm is accommodated in the receptacle of the connecting section of the flexible element. The flexible element covers the first dimensionally-stable element at least in sections, and it also covers the second dimensionally-stable element at least in sections. In a specific embodiment, the flexible element completely covers the first dimensionally-stable element, and it also completely covers the second dimensionally-stable element.

The flexible element typically encloses the first dimensionally-stable element, and it also encloses the second dimensionally-stable element.

In a specific embodiment of the wiper arm, the attachment is connected to the rod arm in such a way that a displacement of the attachment with respect to the rod arm in the longitudinal direction of the rod arm is prevented—in particular, by a latch. This can be achieved, for example, by a latching connection. This usually takes place via two, complementary latching elements—a latching means and a latching recess. For example, one latching element may be attached to the first dimensionally-stable element, and the second latching element, which is complementary to the first latching element, may be attached to the rod arm. The latching connection has the advantage that it can establish a detachable connection.

The attachment is typically connected to the rod arm in such a way that rotation of the attachment about the longitudinal direction of the rod arm is prevented. This is, advantageously, ensured by the shape of the rod arm and the shape of the receptacle of the connecting section. For example, the rod arm may have a polygonal shape, and the receptacles in which it is accommodated may likewise have a complementary polygonal shape.

In a specific embodiment of the wiper arm, the flexible element covers the rod arm over the entire length of the rod arm and/or over the entire circumference of the rod arm. In a typical embodiment, the wiper arm has a nozzle carrier with a nozzle. The nozzle is in fluid connection with the fluid channel of the attachment.

The invention also relates to a windscreen wiper of a vehicle with a wiper arm according to the invention and a wiper blade.

The invention also relates to a method for mounting a fluid channel for conducting a fluid on a rod arm of a wiper arm of a windscreen wiper. An attachment according to the invention is in this case fastened to the rod arm.

In this case, the first dimensionally-stable element and the second dimensionally-stable element are typically first connected to the flexible element in such a way that the flexible element covers the first form-fitting element at least in sections, and the flexible element covers the second form-fitting element at least in sections. The elements connected in this way are then mounted as a unit on the rod arm. Alternatively, the first and the second dimensionally-stable elements are first mounted on the rod arm. The flexible element is then mounted on the rod arm.

The invention also relates to a use of an attachment according to the invention for providing a fluid channel on a rod arm of a wiper arm of a windscreen wiper.

The invention also relates to a system comprising a first attachment according to the invention a second attachment according to the invention. The system furthermore has a coupling means via which the first attachment is connected to the second attachment.

The term, "coupling means," in the sense of the invention, refers to a means which can establish a connection between the first attachment and the second attachment. The coupling means is often tubular and can be connected with one end to a coupling point of the first attachment and with another end to a coupling point of the second attachment. The coupling points can be connectors (see above). The fluid channels of the connected attachments are typically in fluid connection. In specific embodiments, the connection is sealed, so that no fluid can escape in the connection region. The tightness can be achieved, for example, by means of a radial seal in the tubular coupling means. The coupling means may also be hose-like, for example.

BRIEF DESCRIPTION OF THE DRAWINGS

The invention is illustrated with reference to the following drawings, which show only exemplary embodiments of the invention. Shown are:

FIG. 4 shows an exemplary embodiment of a wiper arm according to one embodiment of the invention;

FIG. 5 shows a further example of an attachment according to the invention; and

FIG. 6 shows a sectional view of the attachment of FIG. 5.

DETAILED DESCRIPTION

Figure 1:
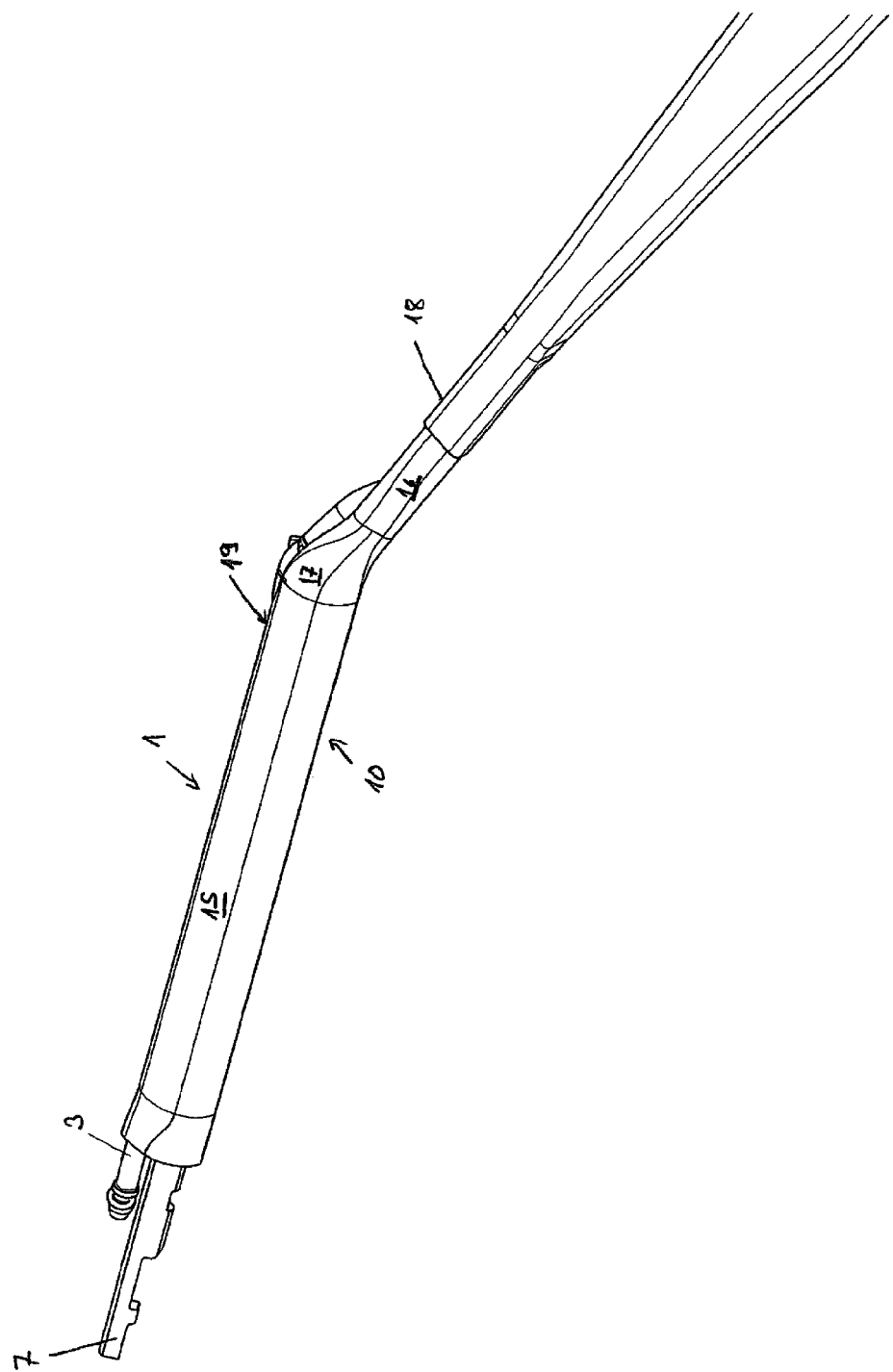
FIG. 1 shows an exemplary embodiment of the attachment according to the invention connected to a rod arm.

FIG. 1 shows an exemplary embodiment of the attachment 1 for a wiper arm, having a rod arm, of a windscreen wiper of a vehicle.

The attachment 1 has a fluid channel for conducting a fluid, which fluid channel cannot be seen in FIG. 1 because the fluid channel is located in the interior of the attachment 1.

The attachment furthermore has a first dimensionally-stable element. The first dimensionally-stable element can be seen well in FIG. 2 and is provided there with the reference sign 2. In the first dimensionally-stable element 2, a first fluid channel section 3 is formed.

Figure 2:
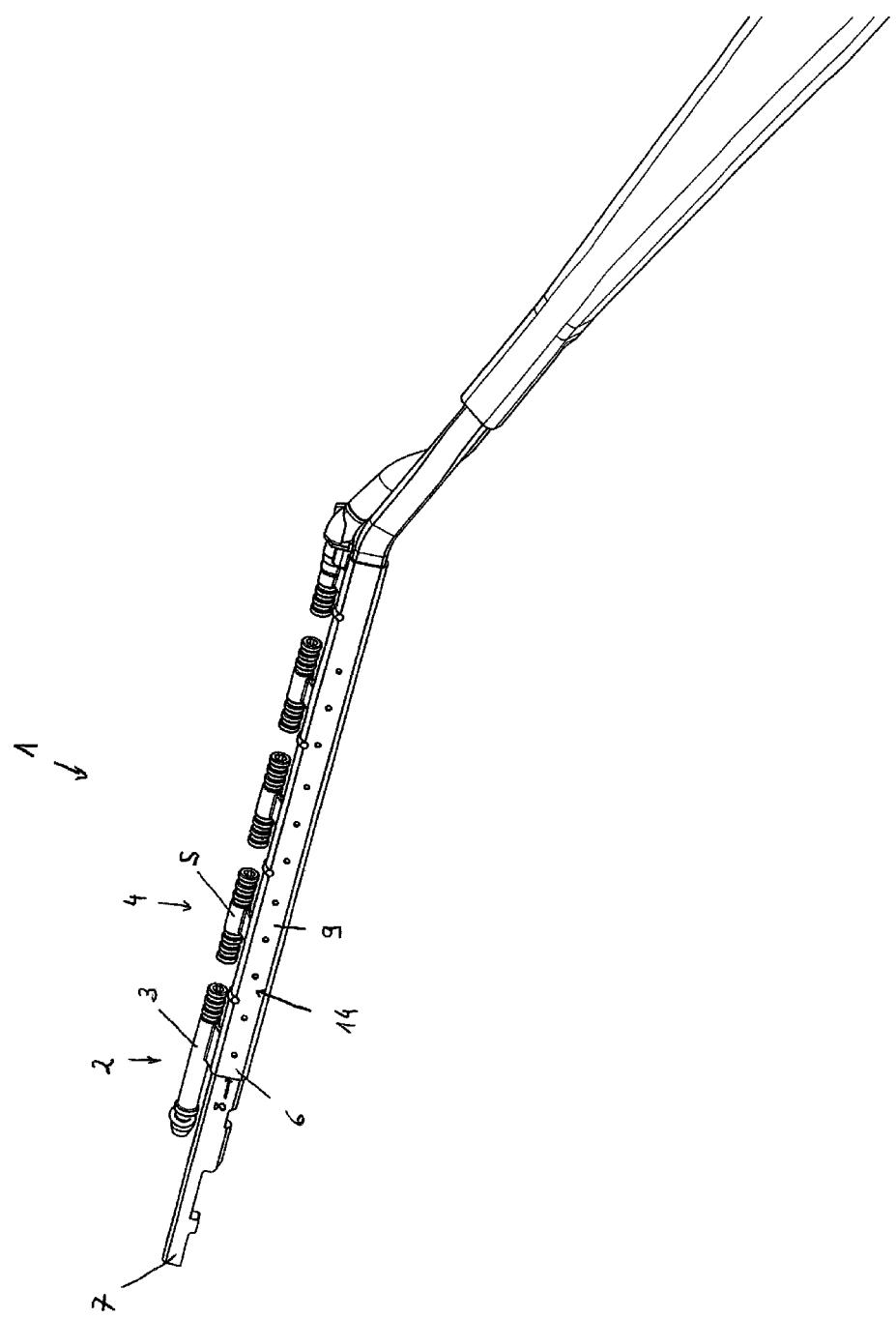
FIG. 2 shows the embodiment of FIG. 1, in which the flexible element has been removed.

In the following, reference is also made to FIG. 2: The attachment 1 furthermore has a second dimensionally-stable element 4. In the second dimensionally-stable element 4, a second fluid channel section 5 is formed.

The first dimensionally-stable element 2 furthermore has a connecting section 6 for connecting the first dimensionally-stable element 2 to the rod arm 7. The connecting section 6 has a receptacle for accommodating the rod arm 7. The receptacle in turn has an opening 8 through which the rod arm can be inserted into the receptacle.

The second dimensionally-stable element 4 furthermore has a connecting section 9 for connecting the second dimensionally-stable element 4 to the rod arm 7. The connecting section 9 has a receptacle for accommodating the rod arm 7. The receptacle in turn has an opening through which the rod arm can be inserted into the receptacle.

Figure 3:
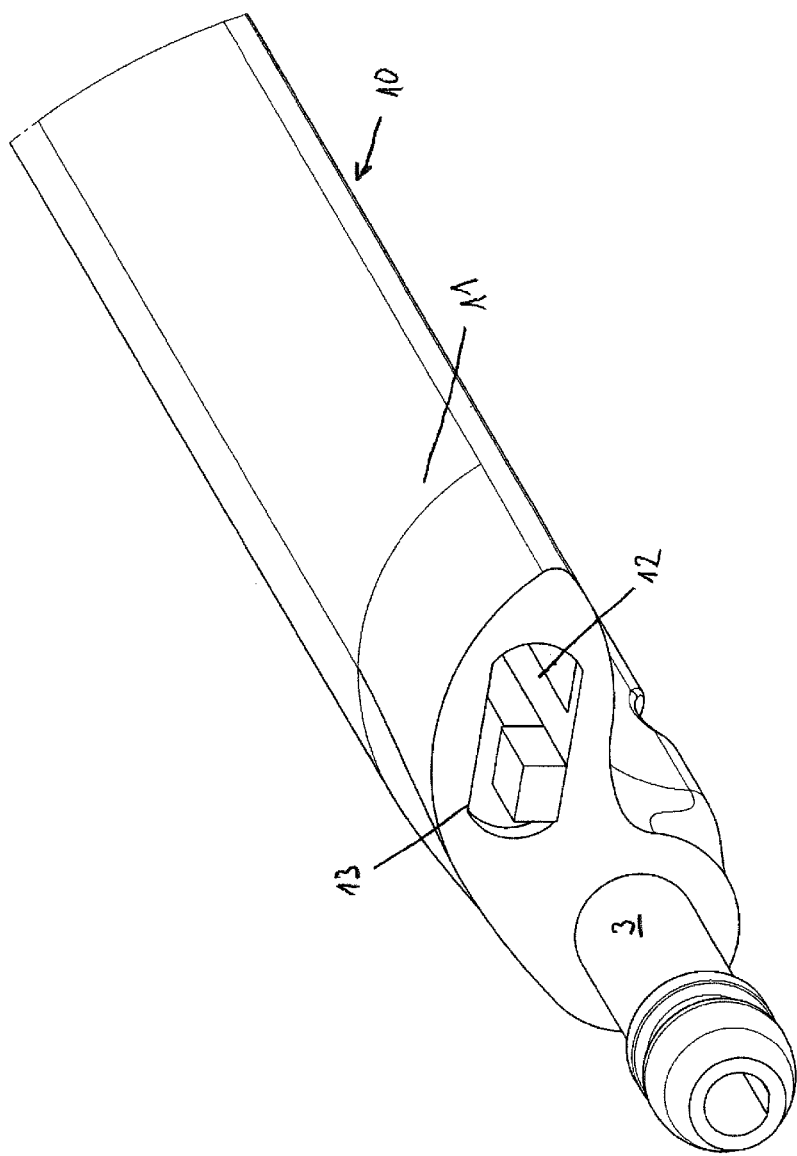
FIG. 3 shows an enlarged partial view of the attachment of FIG. 1, in which the rod arm has been blanked out.
Figure 9:
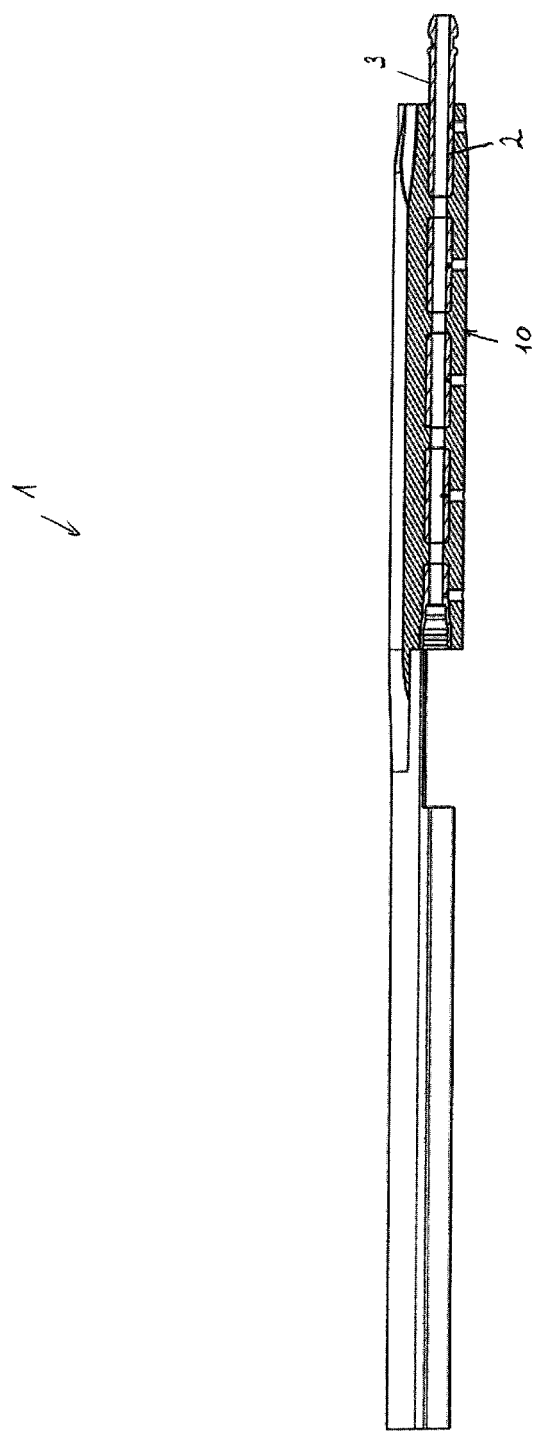

In the following, reference is again made to FIG. 1: A flexible element 10 is provided, which has a connecting section for connecting the flexible element 10 to the rod arm 7. In the following, reference is made to FIG. 3: The connecting section 11 has a receptacle 12 for accommodating the rod arm 7. The receptacle 12 has an opening 13 through which the rod arm can be inserted into the receptacle.

In the following, reference is again made to FIG. 1: In this exemplary embodiment, the flexible element 10 almost completely covers the first dimensionally-stable element. Only part of the first fluid channel section 3 can be seen. The flexible element 10 also covers the second dimensionally-stable element. The latter is completely covered, which is why it cannot be seen in FIG. 1.

In the following, reference is again made to FIG. 2: The attachment 1 has a carrier 14 with a connecting section for connecting the carrier to the rod arm 7. The first dimensionally-stable element 2 and the second dimensionally-stable element 4 are arranged on this carrier in such a way that a section of the connecting section of the carrier forms the connecting section 6 of the first dimensionally-stable element 2, and another section of the connecting section of the carrier forms the connecting section 9 of the second dimensionally-stable element 4. The carrier 14 is tubular in this example. By sliding the tubular carrier 14 onto the rod arm 7, the first dimensionally-stable element and the second dimensionally-stable element are thus also connected to the rod arm.

FIG. 1 also shows that the flexible element 10 has a base body 15 and an end section 16, and that a bending section 17 is provided between the base body 15 and the end section 16. The flexible element can therefore adapt particularly well to the angular shape of the rod arm 7. The flexible element covers almost the entire rod arm, i.e., up to the lever arm 18 of the wiper arm. Since the flexible element in this example has a wind-deflecting surface 19 over the entire length of the flexible element, the airflow can thus be utilized and influenced over almost the entire length of the rod arm in favor of the function of the windscreen wiper. The resistance as a result of the airflow can thus be reduced, and the pressing force on the attachment and thus on the wiper blade can be increased. This ensures that the wiper blade lies against the vehicle window, even at high driving speeds. A high wiping quality is thereby made possible. In addition, the wind-deflecting surface 19 can be designed in such a way that it directs the airflow in favor of the jet, which arises from the fluid being applied from a nozzle to the vehicle window.

FIG. 4 shows an exemplary embodiment of a windscreen wiper 23 according to the invention, with wiper arm 20 and wiper blade 22. The wiper arm 20 comprises an exemplary embodiment of the attachment 1 according to the invention and is connected to the wiper blade 22. It can also be seen that the attachment 1 is coupled with a nozzle carrier 21.

FIG. 5 shows another exemplary embodiment of an attachment 1 according to the invention. It is similar to the previously described embodiments. The same reference signs refer to the same features as in the embodiments above. FIG. 6 shows a sectional view according to the cutting arrows A of FIG. 5. It can be seen here how the flexible element 10 encloses the dimensionally-stable element 2 (and/or the second dimensionally-stable element 4).

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. An attachment for a wiper arm, having a rod arm, of a windscreen wiper of a vehicle, wherein the attachment comprises:
a fluid channel for conducting a fluid,
a first dimensionally-stable element, wherein a first fluid channel section is formed in the first dimensionally-stable element, and
a second dimensionally-stable element, wherein a second fluid channel section is formed in the second dimensionally-stable element,
wherein
the first dimensionally-stable element has a connecting section for connecting the first dimensionally-stable element to the rod arm, wherein the connecting section of the first dimensionally-stable element has a receptacle for accommodating the rod arm, and the receptacle of the first dimensionally-stable element defines an opening through which the rod arm can be inserted into the receptacle of the first dimensionally-stable element,
and/or
the second dimensionally-stable element has a connecting section for connecting the second dimensionally-stable element to the rod arm, wherein the connecting section of the second dimensionally-stable element has a receptacle for accommodating the rod arm, and the receptacle of the second dimensionally-stable element defines an opening through which the rod arm can be inserted into the receptacle of the second dimensionally-stable element,
and
a flexible element is provided which has a connecting section for connecting the first dimensionally-stable element to the rod arm, wherein the connecting section of the flexible element has a receptacle for accommodating the rod arm, and the receptacle of the flexible element defines an opening through which the rod arm can be inserted into the receptacle of the flexible element, wherein the flexible element covers the first dimensionally-stable element at least in sections, and the flexible element covers the second dimensionally-stable element at least in sections.

2. The attachment according to claim 1, wherein a third fluid channel section is formed in the flexible element.

3. The attachment according to claim 1, further comprising a carrier with a connecting section for connecting the carrier to the rod arm, wherein the first dimensionally-stable element and the second dimensionally-stable element are arranged on the carrier in such a way that a section of the connecting section of the carrier forms the connecting section of the first dimensionally-stable element, and another section of the connecting section of the carrier forms the connecting section of the second dimensionally-stable element.

4. The attachment according to claim 1, wherein a connector for a hose and/or a nozzle carrier and/or a wiper blade and/or a fastener is formed on the first dimensionally-stable element, and/or a connector for a hose is formed on the second dimensionally-stable element.

5. The attachment according to claim 1, wherein the first dimensionally-stable element and/or the second dimensionally-stable element has a fluid outlet or a nozzle element.

6. The attachment according to claim 1, wherein the flexible element has a protruding wind deflector.

7. The attachment according to claim 1, wherein the flexible element has a base body and an end section, and wherein a bending section is provided between the base body and the end section.

8. The attachment according to claim 1, further comprising a lateral fluid outlet through which a portion of the fluid guided through the fluid channel can be discharged.

9. A wiper arm of a windscreen wiper of a vehicle with a rod arm, comprising an attachment according to claim 1, wherein the first dimensionally-stable element is connected to the rod arm via the connecting section of the first dimensionally-stable element, wherein the rod arm is accommodated in the receptacle of the connecting section of the first dimensionally-stable element, and/or the second dimensionally-stable element is connected to the rod arm via the connecting section of the second dimensionally-stable element, wherein the rod arm is accommodated in the receptacle of the connecting section of the second dimensionally-stable element, and the flexible element is connected to the rod arm via the connecting section of the flexible element, wherein the rod arm is accommodated in the receptacle of the connecting section of the flexible element, wherein the flexible element covers the first dimensionally-stable element at least in sections, and the flexible element covers the second dimensionally-stable element at least in sections.

10. The wiper arm according to claim 9, wherein the attachment is connected to the rod arm in such a way that a displacement of the attachment with respect to the rod arm in the longitudinal direction of the rod arm is prevented.

11. The wiper arm according to claim 9, wherein the flexible element partially covers the rod arm and the carrier.

12. The wiper arm according to claim 9, further comprising a nozzle carrier with a nozzle and a wiper blade adapter, which nozzle is in fluid connection with the fluid channel of the attachment.

13. A windscreen wiper of a vehicle with a wiper arm according to claim 9 and a wiper blade.

14. A method for mounting a fluid channel for conducting a fluid on a rod arm of a wiper arm of a windscreen wiper, comprising fastening the attachment according to claim 1 and the rod arm.

15. A system comprising a first attachment and a second attachment, the first and second attachments each being the attachment of claim 1, and further comprising coupling means via which the first attachment is connected to the second attachment.

* * * * *